United States Patent [19]

Stasiuk

[11] Patent Number: 5,081,878
[45] Date of Patent: Jan. 21, 1992

[54] TRACTOR TRANSMISSION

[76] Inventor: Michael Stasiuk, 5535 Columbia Street, Vancouver, British Columbia, Canada, V5Y 3H5

[21] Appl. No.: 491,960

[22] Filed: Mar. 12, 1990

[51] Int. Cl.$^5$ ............................................. F16H 03/08
[52] U.S. Cl. ..................................... 74/360; 74/357; 74/359; 74/331; 74/333
[58] Field of Search ............... 74/15.4, 331, 333, 360, 74/357, 359

[56] References Cited

U.S. PATENT DOCUMENTS

| | | | |
|---|---|---|---|
| 2,290,504 | 1/1960 | Sommer | 74/360 |
| 2,772,652 | 12/1956 | Du Shane et al. | 74/360 |
| 2,825,232 | 3/1958 | Sieving et al. | 74/333 |
| 2,869,382 | 1/1959 | Klecker et al. | 74/360 |
| 2,932,208 | 4/1960 | Gerst | 74/360 |
| 2,953,942 | 9/1960 | Schwartz et al. | 74/331 |
| 2,982,141 | 5/1961 | Gerst | 74/360 |
| 3,080,767 | 3/1963 | Price, Jr. | 74/360 |
| 3,301,078 | 1/1967 | Michael | 74/360 |
| 3,301,079 | 1/1967 | Fletcher et al. | 74/360 |
| 3,600,963 | 8/1971 | Portmann | 74/360 |
| 3,675,508 | 7/1972 | Blank | 74/357 X |
| 4,063,464 | 12/1977 | Crabb | 74/331 |
| 4,318,305 | 3/1982 | Wetrich et al. | 74/339 |
| 4,392,391 | 7/1983 | Jameson et al. | 74/333 |
| 4,549,443 | 10/1985 | White | 74/360 |
| 4,589,295 | 5/1986 | Jerry et al. | 74/360 |
| 4,615,240 | 10/1986 | Weiss | 74/740 |
| 4,771,647 | 9/1988 | Stevens | 74/359 X |
| 4,782,714 | 11/1988 | Schletzbaum et al. | 74/360 |
| 4,823,639 | 4/1989 | Krause et al. | 74/359 X |

OTHER PUBLICATIONS

"Diesel Railway Traction", *The Railway Gazette*, (Jul. 9, 1937), pp. 85–88.

*Primary Examiner*—Richard Lorence
*Assistant Examiner*—Matthew Stavish
*Attorney, Agent, or Firm*—Murray E. Thrift; Stanley G. Ade; Adrian D. Battifon

[57] ABSTRACT

A drop box transmission is especially suited for use in heavy equipment of the four-wheel drive, bi-directional Type 1, that is capable of being driven in opposite directions with equal speed and power ranges. The transmission has a four shaft drop from an input shaft carrying high and low range gears alternatively driving a second shaft positioned below the input shaft. A series of gears mounted rotatably on the second shaft are in constant mesh with compatible gears on a third shaft below the second shaft. The second shaft gears are selectively and alternatively engaged with the second shaft to be driven by it. Each of these gears is in constant mesh with a corresponding gear rotating with a third shaft below the second shaft. The third shaft drives a drive gear meshing with a forward drive gear on a fourth, output shaft below the third shaft and also drives a gear on a reversing counter shaft carrying a second gear meshing with a reverse drive gear also carried on the fourth shaft. The forward and reverse drive gears are rotatable on the fourth shaft and are alternatively coupled to it to provide final drive to the fourth shaft.

14 Claims, 2 Drawing Sheets

TRACTOR TRANSMISSION

FIELD OF THE INVENTION

The present invention relates to a drop box transmission for use in heavy equipment, for example agricultural, forestry or construction equipment. The transmission is especially suitable for equipment that is four-wheel drive and is intended to be driven with equal power and at equal speeds in opposite directions.

BACKGROUND

Some types of heavy equipment are designed to travel in both directions. In some cases vehicles of this sort are equipped with four-wheel drive systems in which two sets of wheels are driven from the vehicle engine.

The present invention is concerned with a purely mechanical drop box transmission capable of being driven in both directions with equal speed and power.

SUMMARY

According to the present invention there is provided a drop box transmission for a vehicle comprising:

a casing;

an input shaft rotatable in the casing;

a plurality of input shaft drive gears mounted rotatably on the input shaft;

range selector shift means for selectively and alternatively connecting the input shaft drive gears to the input shaft to be driven thereby;

a second shaft rotatable in the casing, parallel to the input shaft;

a plurality of second shaft driven gears mounted on the second shaft for rotation therewith and in constant mesh with respective ones of the input shaft drive gears;

a plurality of second shaft drive gears mounted rotatably on the second shaft;

ratio selector means for selectively and alternatively connecting the second shaft drive gears to the second shaft to be driven thereby;

a third shaft rotatably mounted in the casing parallel to the first and second shafts;

a plurality of third shaft driven gears mounted on the third shaft for rotation therewith and in constant mesh with respective ones of the second shaft drive gears;

a third shaft drive gear mounted on the third shaft for continuous rotation therewith;

a fourth shaft mounted rotatably in the casing parallel to the first, second, and third shafts;

forward and reverse driven gears rotatably mounted on the fourth shaft, the forward driven gear being in constant mesh with the third shaft drive gear;

a forward and reverse selector means for selectively and alternatively connecting the forward and reverse driven gears to the fourth shaft;

a reverse idler shaft rotatably mounted in the casing parallel to the first, second, third and fourth shafts;

a reverse idler shaft driven gear mounted on the reverse idler shaft for rotation therewith and in constant mesh with the third shaft drive gear;

a reverse idler shaft drive gear mounted on the reverse idler shaft for rotation therewith and in constant mesh with the reverse drive gear.

BRIEF DESCRIPTION OF THE DRAWINGS

In the accompanying drawings which illustrate an exemplary embodiment of the present invention.

DETAILED DESCRIPTION

Figure 1:
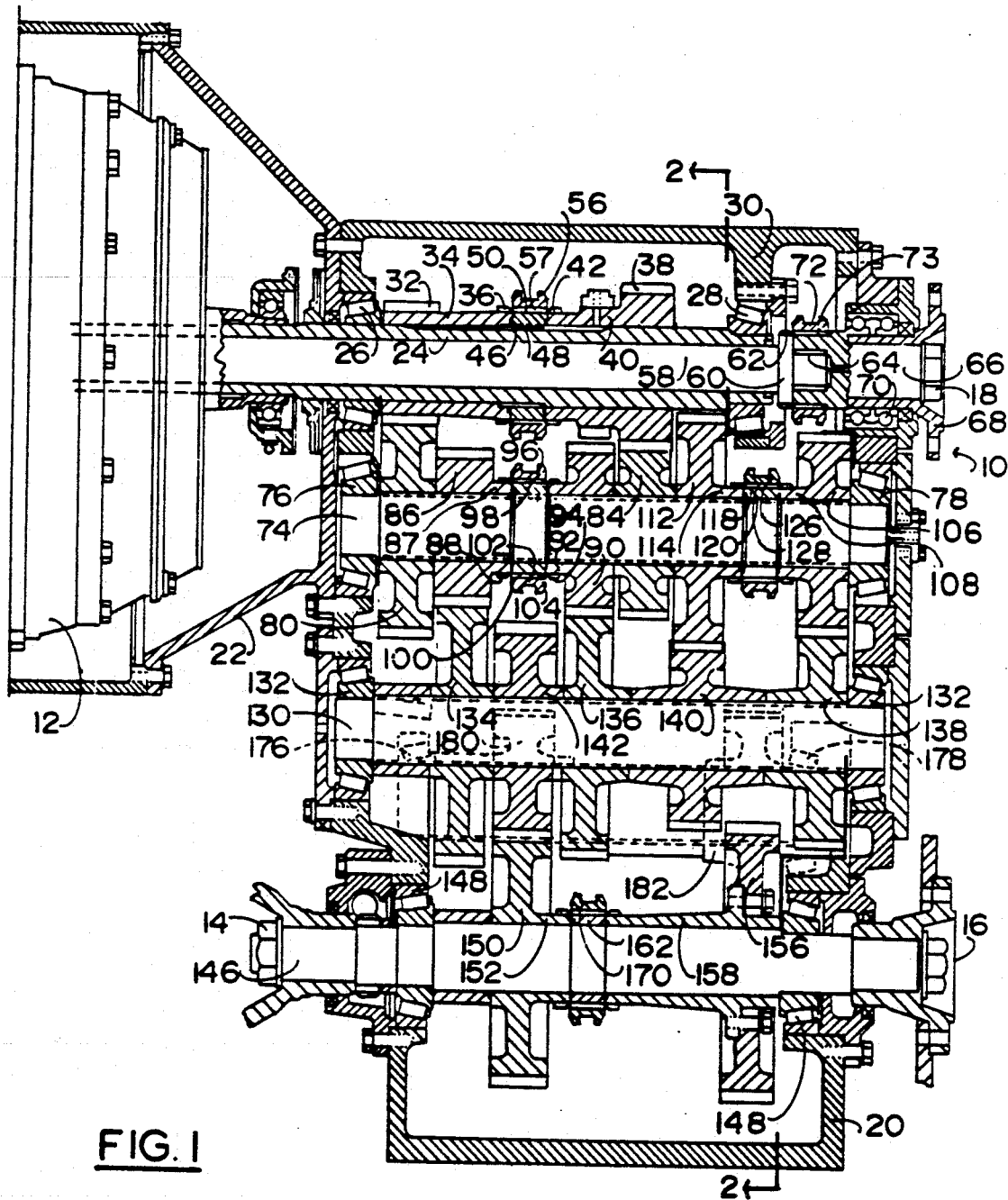
FIG. 1 is a longitudinal cross-section through a transmission constructed according to the present invention.

Referring to the drawings, there is illustrated a transmission 10 connected at its input to a clutch 12. The transmission has two outputs 14 and 16 that are coaxial and located below the input. In the illustrated embodiment, the transmission also has a live power takeoff 18.

The transmission has a transmission casing 20 that is connected at the input end of the transmission to a bell housing 22 enclosing the clutch 12. The input to the transmission is a hollow input shaft 24 that is mounted to the casing at its opposite ends by tapered roller bearings 26 and 28. The bearing 28 is secured in a flange 30 spaced from the end of the casing remote from the bell housing 22 for reasons that will become apparent as this description proceeds.

A low range input shaft drive gear 32 is rotatably mounted on the input shaft 24. The gear has an elongate cylindrical hub 34 with an external spline 36 at the end opposite the gear. A high range input shaft drive gear 38 is also rotatably mounted on the input shaft 24. Gear 38 has an elongate cylindrical hub 40 that projects from the gear, in a direction opposite to the hub 34 of the gear 32. The end of hub 40 carries a spline 42 that matches the spline 36 on the gear 34.

A range selector shift mechanism is mounted on the input shaft 24 between the low and high range drive gears 32 and 40 respectively. The selector mechanism consists of a shift hub 46 mounted on the shaft 24 between the hubs 34 and 40 of the two gears and splined to the shaft by an internal spline 48. The hub also has an external spline 50 that matches the splines on the two gear hubs.

A range selector collar 56 is internally splined at 57 to slide longitudinally on the shift hub 46 to engage either the spline 36 or the spline 42 of the drive gears, thus locking either low range drive gear 32 or high range drive gear 38 to the input shaft by locking the splines of the gear and the shift hub.

The hollow input shaft 24 accommodates a power take-off shaft 58 that extends from the output of the motor by passing the clutch 12. The power take-off shaft has a flange 60 where it projects from the end of the transmission input shaft 24. The flange is splined at 62. The end of the power take-off shaft 58 projects into a bore 64 in the end of a stub shaft 66. The stub shaft is in turn fitted into a coupling flange 68 carried in a bearing assembly 70 in a suitable bore in the transmission casing. The end of the stub shaft 66 adjacent the power take-off shaft flange 60 is splined at 72 to match the spline on the flange. A shift collar 73 is splined to the stub shaft and is slideable into engagement with the spline on the stub shaft flange to lock the power take-off shaft and the stub shaft together.

Immediately below the input shaft 24 and parallel to it is a second shaft 74. The second shaft is mounted in the casing by means of bearings 76 and 78 at its opposite ends. The second shaft has a spline 79 that extends from end to end of the shaft, between the bearings. A low range driven gear 80 is splined to the second shaft 74 and is constantly meshed with the low range input shaft drive gear 32. Similarly, the high range driven gear 84 is splined to the second shaft 74 and is constant mesh with the high range input shaft drive gear 38. The second shaft 74 also carries a first ratio drive gear 86 with a cylindrical hub 87 carrying an external spline 88. A second ratio drive gear 90, also fitted on the second shaft 74, has a hub 92 that is externally splined at 94. The splined hubs of gears 86 and 90 project toward one another and are separated by a first and second ratio shift hub 96. The shift hub 96 is internally splined at 98 to engage the spline on the second shaft 74 so that the two rotate in unison. The hub is also externally splined at 100 to engage an internal spline 104 on the shift collar 102. The shift collar is shiftable longitudinally to lock either the first ratio drive gear 86 or the second ratio drive gear 90 to the shift hub 96 and thence to the second shaft 74.

The second shaft 74 also carries a third ratio drive gear 106 with an externally splined cylindrical hub 108 and a fourth ratio drive gear 112 with an externally splined cylindrical hub 114. The splined hubs of the gears 106 and 112 project towards one another and are separated by a third and fourth ratio shift hub 118. The shift hub is internally splined at 120 to mesh with the spline on the shaft 74 and externally to mesh with the internal spline 128 on a shift collar 126. The shift collar 128 may be shifted longitudinally on the shift hub 118 to lock either the third or the fourth ratio drive gear 106 or 112 to the shaft 74 through the splines on the shift hub 118.

Immediately below the second shaft 74 in the casing, and parallel to it is a third shaft 130. The third shaft is mounted in the casing in bearings 132 a its opposite ends. The third shaft is, like the second shaft, splined throughout its length.

Splined to the third shaft 130 are first, second, third and fourth ratio driven gears 134, 136, 138 and 140 respectively. These are in constant mesh with the first, second, third and fourth drive gears 86, 90, 106 and 112 on the second shaft. The third shaft 130 also carries a drive gear 142 that is splined to the shaft for rotation therewith.

Immediately below the third shaft and parallel to it is a fourth shaft 146 rotatably mounted in the casing by bearings 148. A forward driven gear 150 is rotatably mounted on the fourth shaft 146 and is in constant mesh with the third shaft drive gear 142. The forward driven gear 150 has an externally splined hub 152. A reverse driven gear 156 is also rotatably mounted on the fourth shaft 146 and has an externally splined hub 158. The hubs of the two shafts are separated by a shift hub 162 that is splined to the fourth shaft 146 for rotation therewith. The shift hub is externally splined to engage the internal spline on a shift collar 170. Shifting the collar 170 in one direction or the other will lock either the forward driven gear 150 or the reverse driven gear 156 to the fourth shaft 146.

Figure 2:
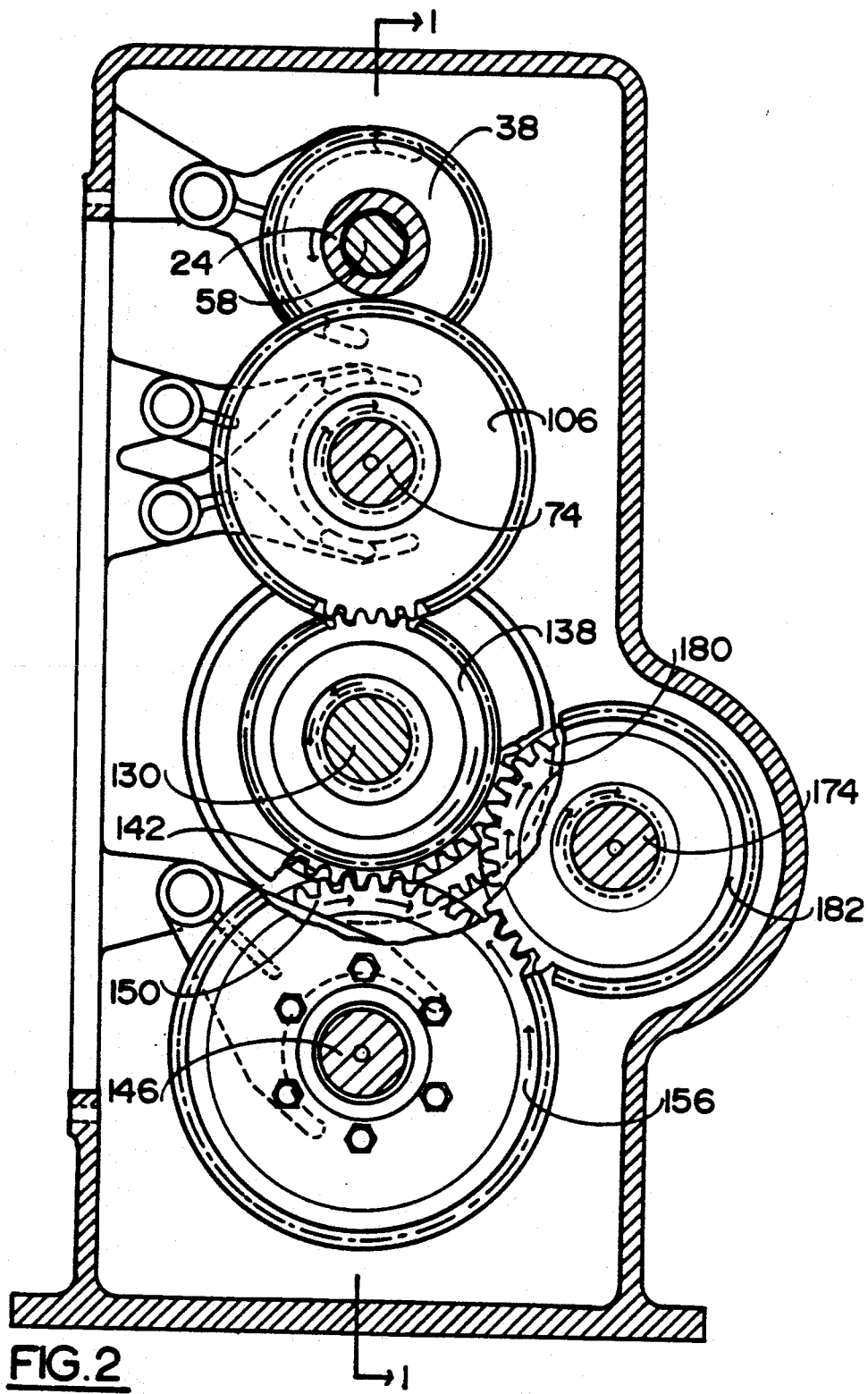
FIG. 2 is a section along line II—II of FIG. 1.

To form a drive connection between the third shaft 130 and the reverse driven gear 156, a reverse idler shaft 174 which is shown in phantom in FIG. 1 and in solid lines in FIG. 2 is mounted beside the third and fourth shafts. The reverse idler shaft is mounted in the casing in appropriate bearings 176 and 178 at its opposite ends. A reverse idler shaft driven gear 180 is mounted on the idler shaft for rotation with the shaft and is in constant mesh with the third shaft drive gear 142. The reverse idler shaft also carries a reverse idler shaft drive gear 182 that is secured to the shaft for rotation with the shaft and is in constant mesh with the reverse driven gear 156.

The transmission as thus described has eight gear ratios either in forward or in reverse. Appropriate selection of the gear ratios of the reverse idler shaft driven and drive gears 180 and 182 and the reverse driven gear 156 on the fourth shaft ensures that the eight ratios are the same both in forward and reverse. The eight gear ratios are achieved in the following way:

FIRST GEAR

The range selector collar is shifted to the left as seen in FIG. 1 to lock the low range drive gear to the input shaft 24. The first and second ratio shift collar 102 is also shifted to the left to lock the first ratio drive gear 86 to the second shaft 74 through the medium of the first and second ratio shift hub 96. The power then passes from the input shaft 24 through the range selector shift hub 46 and shift collar 56 to the low range input shaft drive gear 32 to the low range driven gear 80 on the second shaft 74, thus driving the second shaft, the first and second ratio shift hub 96, the first and second ratio shift collar 102 the first ratio drive gear 86, the first ratio driven gear 134 on the third shaft 130, the third shaft drive gear 142 and whichever of the forward driven gear 150 and reverse driven gear 156 is engaged by the forward-reverse shift collar 170.

SECOND GEAR

For the second ratio, the range selector collar 56 remains shifted to the left as seen in FIG. 1. The first and second ratio shift collar 102 is shifted to the right as seen in that Figure. With this arrangement, the second ratio drive gear 90 is connected to the second shaft 74 through the mechanism the first and second ratio shift collar 102 and shift hub 96. This means that the second ratio drive gear 90 will drive the second ratio driven gear 136 and the third shaft 130 and thence the third shaft drive gear 142 to drive the fourth shaft 146 as described above.

THIRD GEAR

The third gear ratio is achieved by shifting the range selector collar 56 to the left as with the first and second rear ratios, and by shifting the third and fourth ratio shift collar 126 to the right to engage the third ratio drive gear 106 with the second shaft 74 through the shift collar 126, the third and fourth ratio shift hub 118 and their respective splines. The first and second ratio shift collar 102 remains in the neutral position, out of engagement with either the first or the second ratio drive gear 86, 90. Power then flows from the input shaft 24 through the range selector hub 46 and collar 56 to the low range gear sets 32 and 80 to the second shaft 74 and thence through the third and fourth ratio selector hub and collar 118 and 126 to the third ratio drive gear 106, its counterpart 138 on the third shaft and thence to the third shaft drive gear 142.

FOURTH GEAR

The fourth gear ratio is achieved by maintaining the range selector collar 56 shifted to the left as shown in FIG. 1 and by shifting the third and fourth ratio shift collar 126 to the left to engage the fourth ratio drive gear 112 with the second shaft 74 through the shift collar 102 and the shift hub 96. Power then passes from the input shaft 24, through the range selector hub 46 and collar to the low range drive gear 32, the low range driven gear 80, the second shaft 74, the third and fourth ratio shift hub 118, the third and fourth ratio shift collar 126, the fourth ratio drive gear 112, the fourth ratio driven gear 140 on the third shaft and thence through the third shaft to the third shaft drive gear 142.

FIFTH-EIGHTH GEARS

To engage the fifth, sixth, seventh and eighth gear ratios, the range selector collar 56 is shifted to the right as illustrated in FIG. 1 to engage the high range input shaft drive gear 38 with the input shaft 24, thus driving the second shaft 74 through the high range driven gear 84. The individual ratios are then achieved in the same way as the first through fourth gear ratios, that is by shifting the first and second ratio shift collar 102 either to the left or to the right and the third and fourth ratio shift collar 126 either to the right or the left as the case may be for the desired ratio.

The transmission illustrated in the accompanying drawings is an eight-speed transmission. The addition of two gears on the first and second shafts with appropriate ratios would provide a twelve-speed arrangement with identical ratios in both forward and reverse.

Thus, while one embodiment of the invention has been described in the foregoing, it is to be understood that other embodiments are possible without departing from the spirit and scope of the invention. The scope of the invention is to be ascertained by reference to the appended claims.

I claim:

1. A drop box transmission for a vehicle comprising:
a casing;
a first, input shaft rotatable in the casing;
a plurality of input shaft drive gears mounted rotatably on the input shaft;
range selector shift means for selectively and alternatively connecting the input shaft drive gears to the input shaft to be driven thereby;
a second shaft rotatable in the casing, parallel to the input shaft;
a plurality of second shaft driven gears mounted on the second shaft for rotation therewith and in constant mesh with respective ones of the input shaft drive gears;
a plurality of second shaft drive gears mounted rotatably on the second shaft;
ratio selector means for selectively and alternatively connecting the second shaft drive gears to the second shaft to be driven thereby;
a third shaft rotatably mounted in the casing parallel to the first and second shafts;
a plurality of third shaft driven gears mounted on the third shaft for rotation therewith and in constant mesh with respective ones of the second shaft drive gears;
a third shaft drive gear mounted on the third shaft for continuous rotation therewith;
a fourth shaft mounted rotatably in the casing parallel to the first, second, and third shafts;
forward and reverse driven gears rotatably mounted on the fourth shaft, the forward driven gear being in constant mesh with the third shaft drive gear;
a forward and reverse selector means for selectively and alternatively connecting the forward and reverse driven gears to the fourth shaft;
a reverse idler shaft rotatably mounted in the casing parallel to the first, second, third and fourth shafts;
a reverse idler shaft driven gear mounted on the reverse idler shaft for rotation therewith and in constant mesh with the third shaft drive gear;
a reverse idler shaft drive gear mounted on the reverse idler shaft for rotation therewith and in constant mesh with the reverse driven gear.

2. A transmission according to claim 1 wherein the gear ratio of the third drive gear to the forward driven gear is the same as the overall gear ratio of the third drive gear to the reverse driven gear through the reverse idler shaft drive and driven gears.

3. A transmission according to claim 2 wherein the input shaft drive gears comprise low range drive gear and a high range drive gear.

4. A transmission according to claim 3 wherein the second shaft drive gears comprise first, second, third and fourth ratio drive gears.

5. A transmission according to claim 4 wherein the ratio selector means comprise a first and second ratio selector for selectively and alternatively connecting the first and second ratio drive gears to the second shaft and a third and fourth ratio selector for selectively and alternatively connecting the third and fourth ratio drive gears to the second shaft.

6. A transmission according to claim 5 including power output means connected to the fourth shaft.

7. A transmission according to claim 5 including power output means connected to the fourth shaft at one end thereof.

8. A transmission according to claim 5 including power output means connected to the fourth shaft at opposite ends thereof.

9. A transmission according to claim 6 including power takeoff means comprising a power takeoff shaft parallel to the first shaft.

10. A transmission according to claim 9 wherein the power takeoff means include clutch means for selectively engaging and disengaging the power takeoff means.

11. A transmission according to claim 10 wherein the first shaft is tubular and the power takeoff shaft extends along the center of the first shaft.

12. A transmission according to claim 11 including clutch means operatively associated with the first shaft for engaging and disengaging the first shaft from a source of power and coupling means operatively associated with the power takeoff shaft for connecting the power takeoff shaft to the source of power independently of the clutch means.

13. A transmission according to claim 5 wherein the first, second, third and fourth shafts are vertically aligned.

14. A drop box transmission comprising:
a casing;
a first input shaft rotatable in the casing;
low and high range input shaft drive gears mounted rotatably on the input shaft;
a range selector shift mechanism for connecting a selected one of the low range and high range drive gears to the input shaft to be driven thereby;
a second shaft rotatable in the casing, parallel to the input shaft;
low and high range driven gears mounted on the second shaft for rotation therewith and in constant mesh with the respective low and high range drive gears;
first, second, third and fourth ratio drive gears mounted rotatably on the second shaft;

a first and second ratio selector means for selectively connecting one or the other of the first and second ratio drive gears to the second shaft for rotation therewith;

third and fourth ratio selector means for selectively connecting one or the other of the third and fourth ratio drive gears to the second shaft for rotation therewith;

a third shaft rotatably mounted in the casing parallel to the first and second shafts;

first, second, third and fourth ratio driven gears mounted on the third shaft for rotation therewith and in constant mesh with the first, second, third and fourth ratio drive gears respectively;

a third shaft drive gear mounted on the third shaft for continuous rotation therewith;

a fourth shaft mounted rotatably in the casing parallel to the first, second, and third shafts;

forward and reverse driven gears rotatably mounted on the fourth shaft, the forward driven gear being in constant mesh with the third shaft drive gear;

a forward and reverse selector means for selectively connecting the forward and reverse driven gears to the fourth shaft;

a reverse idler shaft rotatably mounted in the casing parallel to the first, second, third and fourth shafts;

a reverse idler shaft driven gear mounted on the reverse idler shaft for rotation therewith and in constant mesh with the third shaft driven gear;

a reverse idler shaft drive gear mounted on the reverse idler shaft for rotation therewith and in constant mesh with the reverse drive gear, the gear ratio on the third drive gear to the forward driven gear being the same as the overall gear ratio of the third drive gear to the reverse driven gear through the reverse idler shaft drive and driven gears.

* * * * *